United States Patent
Webber et al.

(10) Patent No.: US 6,588,796 B2
(45) Date of Patent: Jul. 8, 2003

(54) HIGH PRESSURE AIR BAG INFLATION SYSTEM

(75) Inventors: James Lloyd Webber, Shelby Township, MI (US); Steven Aurel Damian, Springboro, OH (US)

(73) Assignee: Delphi Technologies, Inc., Troy, MI (US)

( * ) Notice: Subject to any disclaimer, the term of this patent is extended or adjusted under 35 U.S.C. 154(b) by 50 days.

(21) Appl. No.: 09/802,129

(22) Filed: Mar. 8, 2001

(65) Prior Publication Data

US 2002/0125694 A1 Sep. 12, 2002

(51) Int. Cl.[7] .............................................. B60R 21/26
(52) U.S. Cl. .................................... 280/737; 280/730.2
(58) Field of Search ............................ 280/730.2, 737, 280/741, 736; 222/5; 137/67, 68.11, 68.13

(56) References Cited

U.S. PATENT DOCUMENTS

| | | | | |
|---|---|---|---|---|
| 3,749,282 A | * | 7/1973 | Day et al. ........................ | 222/5 |
| 5,482,315 A | * | 1/1996 | Chandler et al. ............. | 280/741 |
| 5,564,740 A | * | 10/1996 | Zakula ........................ | 280/737 |
| 5,588,670 A | * | 12/1996 | Storey et al. ............. | 280/730.2 |
| 6,099,029 A | * | 8/2000 | H.ang.land et al. ......... | 280/729 |
| 6,123,355 A | * | 9/2000 | Sutherland ................. | 280/728.2 |
| 6,145,876 A | * | 11/2000 | Hamilton ..................... | 280/736 |
| 6,206,412 B1 | * | 3/2001 | Swann et al. ............. | 280/730.2 |
| 6,217,060 B1 | * | 4/2001 | Mangold et al. ......... | 280/730.2 |
| 6,237,940 B1 | * | 5/2001 | Shirk et al. ............... | 280/730.2 |
| 6,293,581 B1 | * | 9/2001 | Saita et al. ............... | 280/730.2 |

\* cited by examiner

*Primary Examiner*—Paul N. Dickson
*Assistant Examiner*—David R. Dunn
(74) *Attorney, Agent, or Firm*—Kathryn A. Marra

(57) ABSTRACT

An inflatable air bag system having an inflatable curtain-like cushion element for inflated deployment away from a storage position along the roof rail portion of the vehicle frame to provide coverage over an expanded region of the vehicle interior. The cushion element is inflated by the rapid introduction of a substantially inert gas such as helium from an elongate gas storage receptacle extending at least partially along the roof rail portion of the vehicle frame. The gas storage receptacle serves as a profiling and stiffening support member for the cushion element in the storage position extending along the roof rail. The inflation gas may be discharged directly into an interior portion of the cushion element so as to promote rapid expansion and deployment of the cushion element over centralized regions of the surface to be covered.

35 Claims, 5 Drawing Sheets

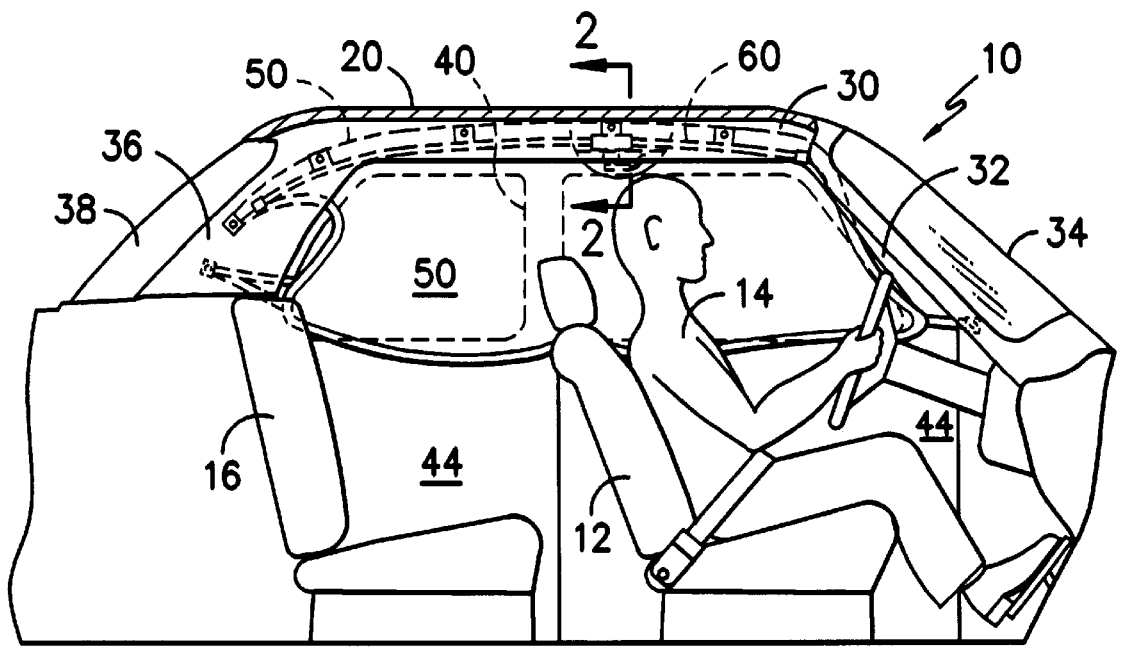
FIG. -1-
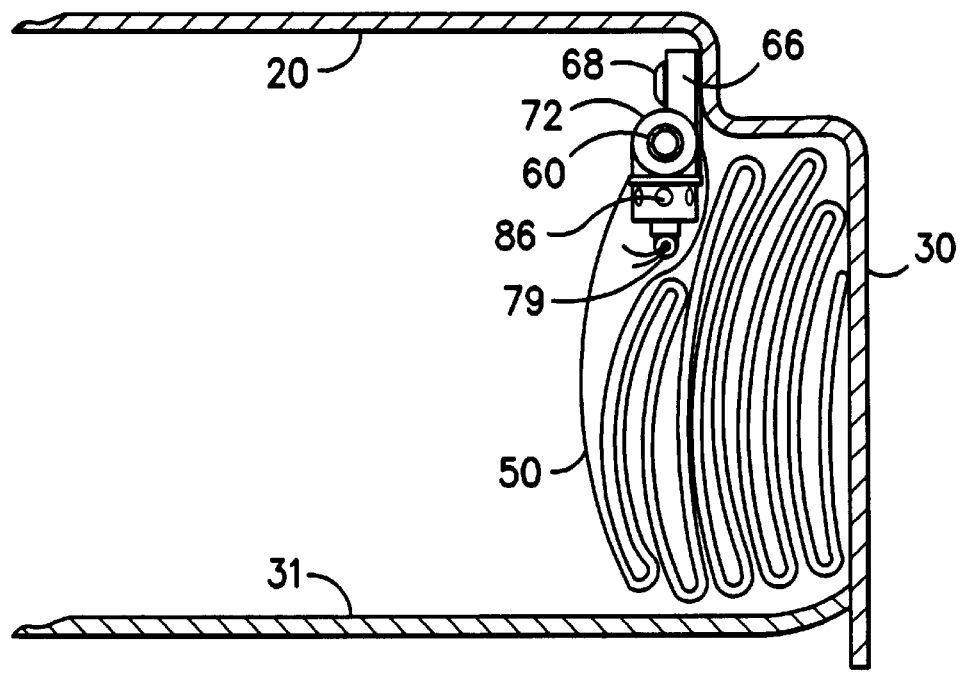
FIG. -2A-

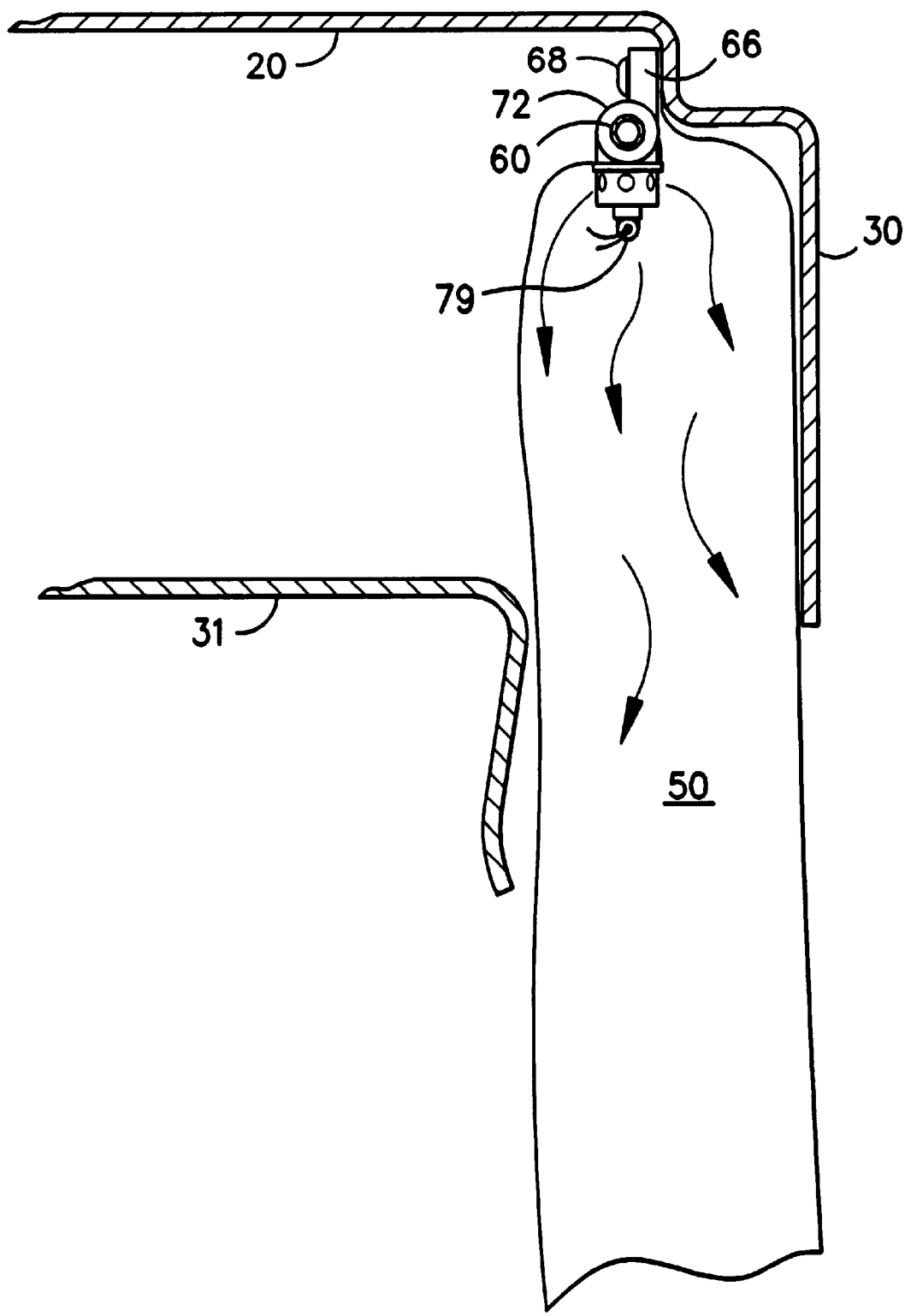
FIG. -2B-

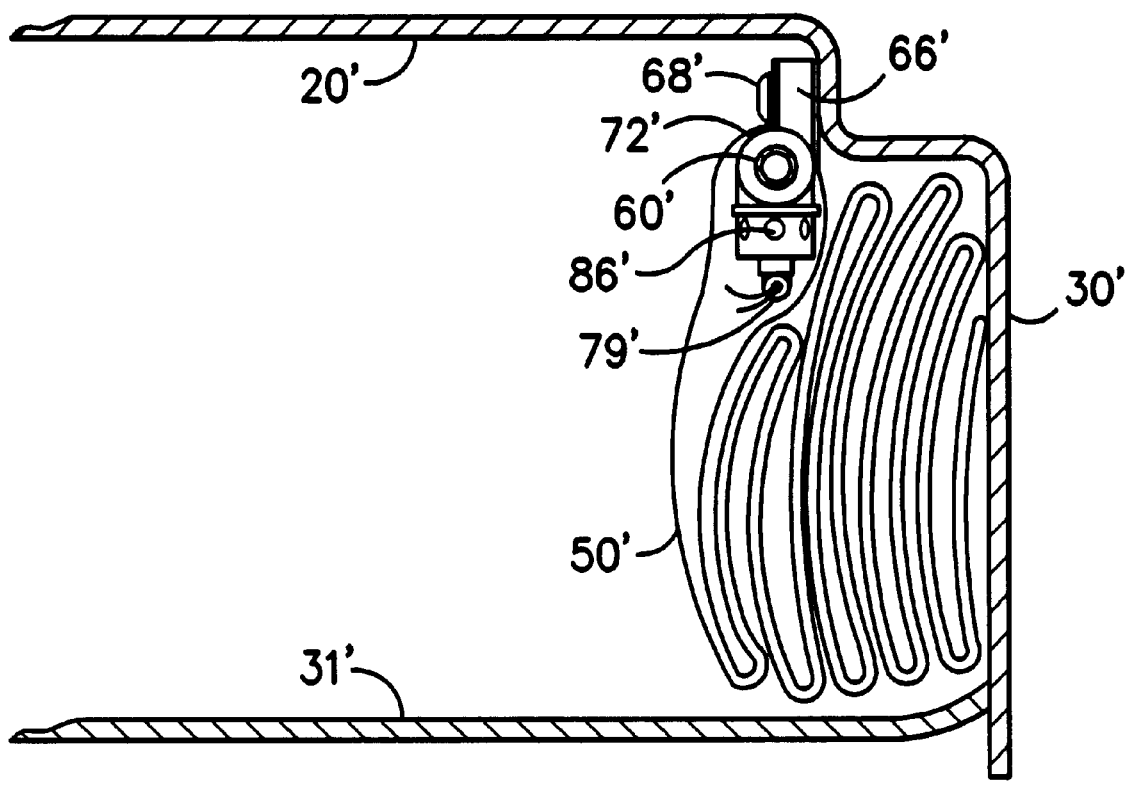
FIG. -2C-

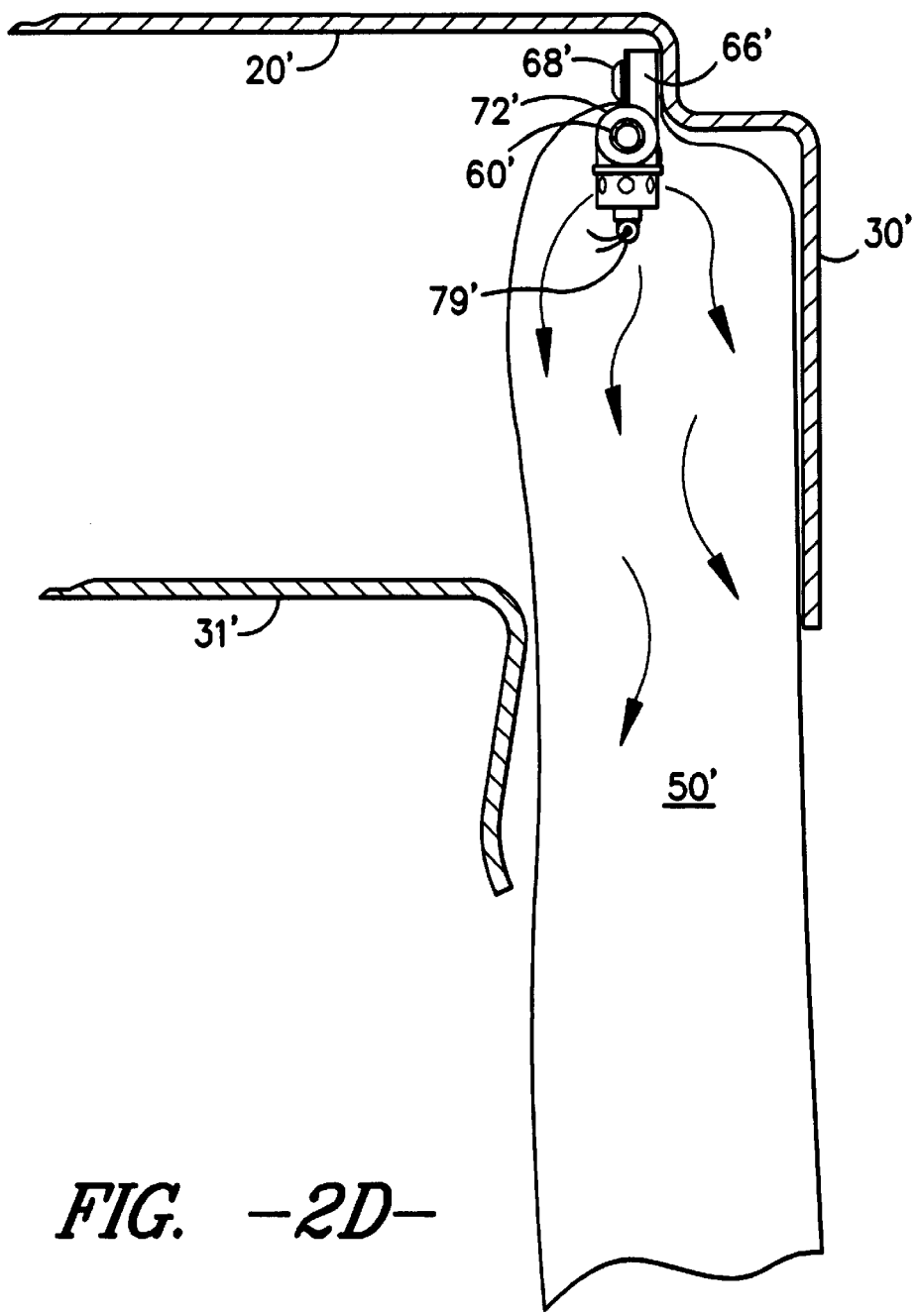
FIG. -2D-
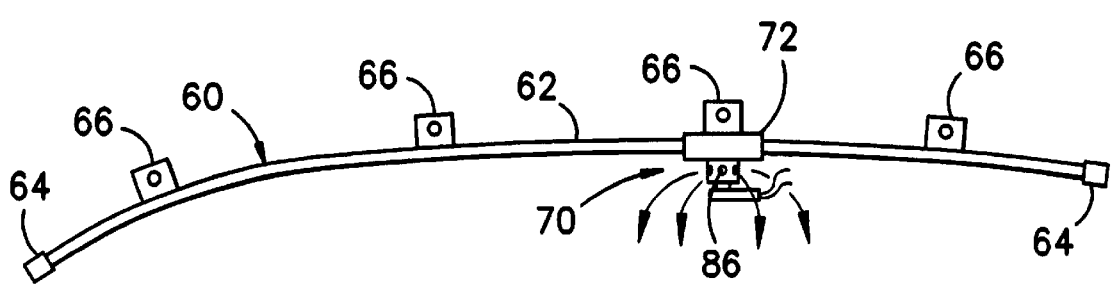
FIG. -3-

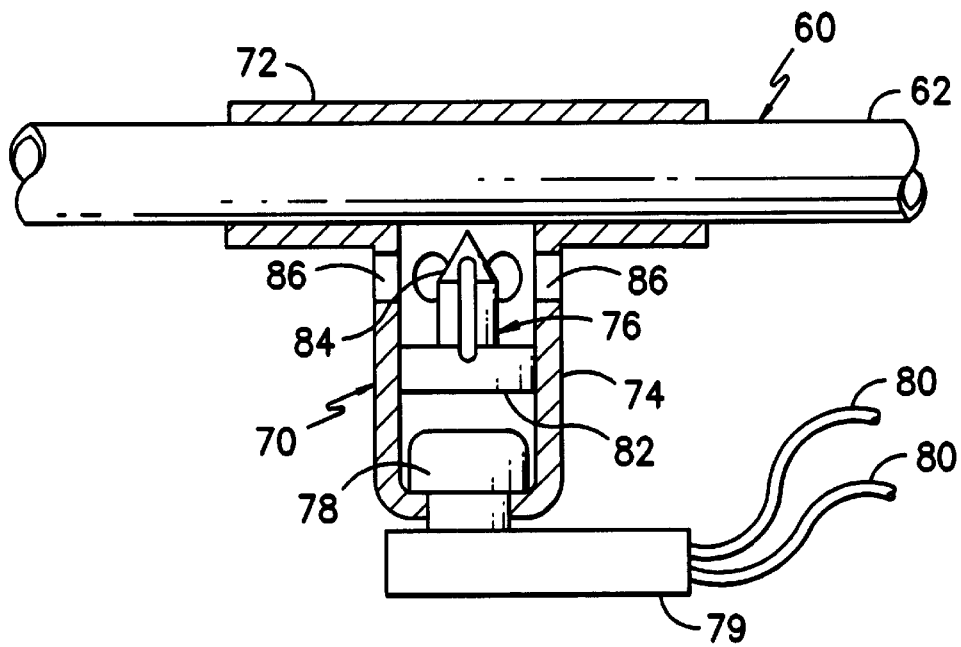
FIG. -4-
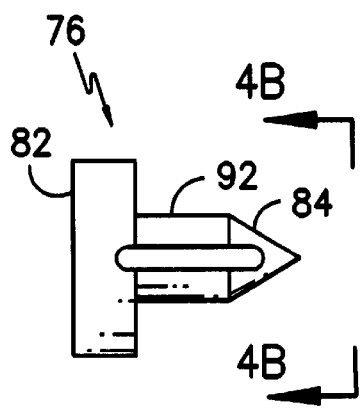
FIG. -4A-
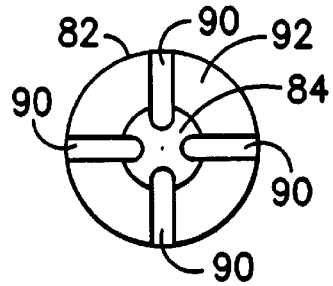
FIG. -4B-
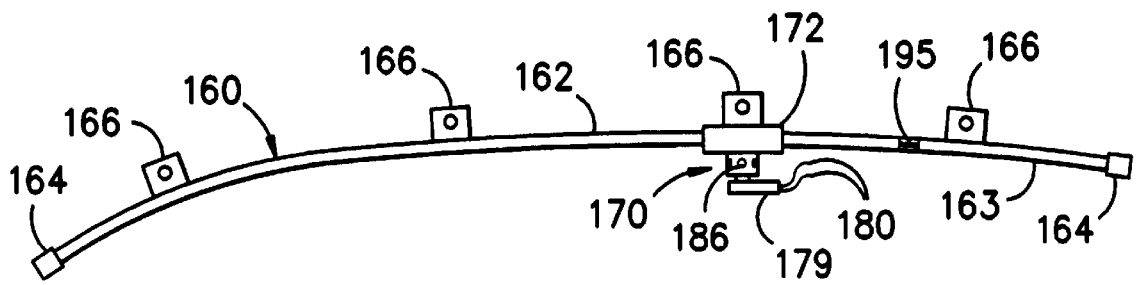
FIG. -5-

HIGH PRESSURE AIR BAG INFLATION SYSTEM

TECHNICAL FIELD

The present invention relates to an inflatable air bag system useful in the deployment of an inflatable air bag cushion over a portion of a vehicle during a collision event. More particularly, the invention relates to an inflatable air bag system including an air bag cushion deployable from a confined storage position over a region of extended length wherein such deployment is carried out by the introduction of a gaseous inflation medium from a pressurized storage receptacle which extends at least partially along the region to be covered by the air bag cushion. The discharge of the inflation medium into the air bag cushion may be either substantially instantaneous or may be prolonged over an extended period so as to realize desired inflation characteristics.

BACKGROUND OF THE INVENTION

It is well known in motor vehicles to provide air bag cushions for protecting a vehicle occupant during a collision event. Such air bag cushions are typically in fluid communication with chemically activated gas generating inflators which expel inflation gas into the air bag cushion upon the occurrence of predetermined vehicle conditions such as deceleration exceeding a certain level. The inflation gas which is released by such chemically activated inflators is typically expelled at an elevated temperature which may require the air bag cushion to incorporate heat shielding elements and/or gas defusers to protect against any damage which might be caused to the air bag cushion by impingement of such high temperature gases. It is further known to operate such reaction based inflators in combination with reservoirs of pressurized stored gas in so-called "hybrid inflators" to increase available inflation volume while lowering the overall temperature of the inflation gas.

It is also known to provide air bag systems which include inflatable restraint cushions deployable over extended portions of a vehicle interior from storage positions extending adjacent to the roof along the roof rail portion of the vehicle frame such that the inflatable restraint cushion extends downwardly in substantially curtain-like fashion between the occupant to be protected and the side portions of the vehicle adjacent to such occupant. Such coverage is intended to provide a degree of cushioning restraint for the occupant during a side impact or extended roll over collision event. Inflation of such side curtain air bag cushions is typically achieved by means of a standard inflator packaged at a location such as the "A" pillar or "C" pillar which is remote from the storage position of the air bag cushion. Such prior systems may require the incorporation of a diffuser tube within the air bag cushion to obtain early inflation at a central portion of the air bag cushion.

Prior curtain-like air bag cushions which have been deployable from storage positions adjacent the roof of a vehicle have thus required a generally complex arrangement involving the remote generation of inflation gas and the subsequent conveyance of such inflation gas into the curtain structure through a diffusion element in order to achieve rapid and substantially uniform deployment of the air bag cushion away from its storage location. Moreover, such prior curtain-like air bag cushions have typically been inflated by relatively high temperature reaction gases which may dictate the utilization of heat shielding elements and/or diffusers to guard against heat damage to the air bag cushion. In addition, the remote placement of such inflation units may result in undesirable complexity in the mounting and storage of such inflators at positions remote from the storage location of the air bag cushion itself.

SUMMARY OF THE INVENTION

This invention provides advantages and alternatives over the prior art by providing an inflatable air bag system including an inflatable cushion element for inflated deployment over an extended surface to be covered from a storage position extending adjacent to such surface. Inflation of the cushion element is achieved by the rapid release of pressurized inflation gas from a relatively low profile gas impermeable sealed enclosure extending adjacent to the region to be covered. Due to the presence of the gas storage receptacle in the region immediately adjacent to the region to be covered by the inflatable cushion element, inflation gas may be conveyed directly into interior portions of the inflatable cushion element without the use of a diffuser element. In addition, due to the fact that the inflation gas is conveyed outwardly from the gas storage receptacle by pressure relief, rather than chemical reaction, the air bag cushion is not subjected to undue temperature increases.

According to one aspect of the present invention, an inflatable air bag system is provided including a substantially curtain-like cushion element for deployment from an elongate storage compartment in covering relation over a portion of a vehicle passenger compartment generally adjacent to an occupant to be protected. Inflation of the inflatable cushion element is achieved by the rapid release of a pressurized volume of substantially inert gas from an elongate storage receptacle disposed substantially adjacent to the region to be covered and extending at least partially along the length of the storage compartment of the cushion element.

According to another aspect of the present invention, an inflatable air bag system is provided including a substantially curtain-like cushion element for deployment downwardly from a position of storage along the roof rail of a vehicle in covering relation over a side portion of a vehicle passenger compartment generally adjacent to an occupant to be protected. Inflation of the inflatable cushion element is achieved by the rapid release of a pressurized volume of substantially inert gas from an elongate storage receptacle disposed along the roof rail of the vehicle and extending along at least a portion of the length of the passenger compartment so as to provide stiffening support to the stored cushion element along the profile of the roof rail. Release of the gas from the storage receptacle is carried out by the localized perforation of the storage receptacle.

According to another aspect of the present invention, an inflatable air bag system is provided including a substantially curtain-like cushion element for deployment downwardly from a position of storage along the roof rail of a vehicle in covering relation over a side portion of a vehicle passenger compartment generally adjacent to an occupant to be protected. Inflation of the inflatable cushion element is achieved by the rapid release of a pressurized volume of substantially inert gas from an elongate storage receptacle disposed along the roof rail of the vehicle and extending along at least a portion of the length of the passenger compartment. Release of the gas from the storage receptacle is effected by the localized perforation of the storage receptacle for substantially direct conveyance into a central portion of the cushion element at a position along the length of the passenger compartment.

According to another aspect of the present invention, an inflatable air bag system is provided including a substantially curtain-like cushion element for deployment downwardly from a position of storage along the roof rail of a vehicle in covering relation over a side portion of a vehicle passenger compartment generally adjacent to an occupant to be protected. Inflation of the inflatable cushion element is achieved by the rapid release of a pressurized volume of inflation gas from an elongate storage receptacle disposed along the roof rail of the vehicle and extending along at least a portion of the length of the passenger compartment. The storage receptacle includes a primary storage compartment and at least one secondary storage compartment that release inflation gas at different rates so as to prolong the period of gas discharge in a controlled manner.

According to one exemplary embodiment of the present invention, an inflatable air bag system is provided which includes an inflatable curtain-like cushion element for inflated deployment downwardly away from a storage position along the roof rail portion of the vehicle frame to provide coverage over a side portion of the vehicle interior rearward of the "A" pillar of the vehicle frame in side relation to an occupant within the interior of the vehicle. The cushion element is inflated by the rapid introduction of a substantially inert gas such as helium from an elongate gas storage receptacle extending at least partially along the roof rail portion of the vehicle frame. The gas storage receptacle serves as a profiling and stiffening support member for the cushion element in the storage position extending along the roof rail. The inflation gas is discharged directly into an interior portion of the cushion element so as to promote rapid expansion and deployment of the cushion element over centralized regions of the surface to be covered. The rapid expulsion of the inflation gas from the gas storage receptacle may be achieved by the controlled puncture of the gas storage receptacle at a location corresponding to the desired point of inflation gas introduction into the cushion element.

BRIEF DESCRIPTION OF THE DRAWINGS

The accompanying drawings which are incorporated in and which constitute a part of this specification illustrate several potentially preferred embodiments of the present invention and, together with the general description of the invention given above and the detailed description set forth below, serve to explain the principles of the invention wherein:

FIG. 1 is a cut-away view of the interior of an automotive vehicle incorporating an embodiment of an inflatable air bag system according to the present invention upon activation of the system;

FIG. 2A is a view taken generally along line 2—2 in FIG. 1 prior to activation of the inflatable air bag system and illustrating a first storage arrangement of components of the air bag system prior to deployment;

FIG. 2B is a view similar to FIG. 2A following deployment;

FIG. 2C is a view similar to FIG. 2A illustrating a second storage arrangement of components of the air bag system prior to deployment;

FIG. 2D is a view similar to FIG. 2C following deployment;

FIG. 3 is a view of the gas storage receptacle for use in an inflatable air bag system according to the present invention;

FIG. 4 is a partial cut-away view illustrating a gas release mechanism for use in an inflatable air bag system according to the present invention;

FIG. 4A illustrates an embodiment of a penetrating member useful in a gas release mechanism as shown in FIG. 4;

FIG. 4B is a view taken generally along line 4B—4B in FIG. 4A; and

FIG. 5 is a view similar to FIG. 3 illustrating an alternative embodiment of a gas storage receptacle useful in an inflatable air bag system according to the present invention.

While the invention has been illustrated and generally described above and will hereinafter be described in connection with certain potentially preferred embodiments, it is to be understood and appreciated that in no event is the invention to be limited to such illustrated and described embodiments. On the contrary, it is intended that the present invention shall extend to any and all alternatives and modifications as may embrace the broad principles of this invention within the true spirit and scope thereof.

DESCRIPTION OF THE PREFERRED EMBODIMENT

Turning now to the drawings wherein to the extent possible corresponding components are designated by like reference numerals throughout the various views, in FIG. 1 there is illustrated a transportation vehicle 10 such as an automotive vehicle as will be well known to those of skill in the art. The vehicle 10 includes a front seat 12 which may be used to support a front seated vehicle occupant 14. The vehicle 10 may further include a rear seat 16 which may be used to support a rear occupant (not shown). As will be appreciated, while the front set 12 and the rear seat 16 are illustrated as being located on the driver's side of the vehicle 10, the present invention is also useful in the protection of an occupant (not shown) seated in either the front seat or rear seat on the passenger side of the vehicle. Moreover, while the vehicle 10 is illustrated as housing 2 rows of seats 12, 16, it is likewise contemplated that the vehicle 10 may house only a single row of seats 12 or may likewise include three or more rows of seats if desired.

As will be appreciated by those of skill in the art, the vehicle 10 preferably includes a covering roof member 20 and a structural roof rail 30 (FIGS. 2A–2D) that extends generally downwardly away from the roof member 20 between the roof member 20 and doors 44 or other side panel structures. The intersection between the roof member 20 and the roof rail 30 is preferably hidden from view by a trim element or head lining material 31 such as a foam backed fabric composite as will be well known to those of skill in the art. As will be appreciated, the actual configuration of the roof rail 30 may be subject to a broad range of alternatives as dictated by design and styling criteria.

In addition to the roof rail 30 the structural frame of the vehicle 10 typically includes a series of structural pillars that extend downwardly from the roof rail 30 at locations along the length of the passenger compartment within the vehicle 10. By way of example only, and not limitation, in the illustrated vehicle 10 having 2 rows of seats 12, 16 a forward pillar element referred to as the "A" pillar 32 extends away from the roof rail 30 and along the lateral edge of a substantially forward facing windshield 34. In like manner, a rear pillar member commonly referred to as the "C" pillar 36 extends away from the roof rail 30 along the lateral edge of a rear window 38. An intermediate pillar commonly referred to as a "B" pillar 40 (shown in hidden lines) may extend away from the roof rail between doors 44 at a position intermediate the "A" pillar 32 and the "C" pillar 36. As will be appreciated, in the event that multiple rows of seats are incorporated within the vehicle 10, a number of such intermediate pillars may be present along the length of the vehicle interior.

As illustrated, an inflatable cushion 50 of substantially curtain-like character is stored for deployment along at least a portion of the roof rail 30 for expansion downwardly away from the roof rail 30 over a portion of the vehicle to be covered. As will be appreciated, while the storage position of the inflatable cushion 50 is illustrated as extending substantially the entire length of the passenger compartment within the vehicle 10 between the "A" pillar 32 and the "C" pillar 36, it is contemplated that the folded inflatable cushion 50 may extend over some diminished portion of the total length if desired. Thus, it is contemplated that the inflatable cushion 50 need not cover the entire expanse rearward of the "A" pillar 32 unless such coverage is desired. In addition, it is contemplated that the inflatable cushion 50 may be stored at any number of other locations adjacent to other regions over which coverage may be desired. By way of example only and not limitation, it is contemplated that one such storage location may extend along the edge of the windshield 34 so as to give rise to coverage over at least a portion of the windshield 34 upon deployment. Thus, the present invention is by no means limited to application over a side portion of a vehicle interior.

Inflation gas is introduced into the inflatable cushion 50 from a gas storage receptacle 60 which may be stored in the same region as the folded inflatable cushion 50. As illustrated in FIG. 3, the gas storage receptacle 60 preferably includes a substantially seamless elongate body portion 62 sealed by one or more end caps 64. As shown, a series of mounting brackets 66 are preferably disposed along the length of the body portion 62 for attachment to the roof rail 30 or other underlying support structure such that the gas storage receptacle 60 is mounted at least partially along the length of the passenger compartment at a position above the interior surface covered by the inflatable cushion 50 upon deployment. As illustrated, the gas storage receptacle may be curved in a profile generally corresponding to the pattern of the roof rail if desired, although it may also be substantially straight. Attachment of the gas storage receptacle 62 to the roof rail portion of the vehicle frame may be achieved by the use of a series of cooperating screws 68 or other fastening elements that pass through both the mounting brackets 66 and attachment holes within the upper edge of the inflatable cushion 50. By using such a mounting arrangement, it has been found that both the inflatable cushion 50 and the gas storage receptacle 60 may be housed in secure relationship within a common hidden region running substantially along the roof rail 30 thereby avoiding the need to mount an inflation device at a remote location along the "A" pillar 32 and/or along the "C" pillar 36.

As previously indicated, the gas storage receptacle 60 contains a volume of inflation gas under extremely high pressure for discharge into the inflatable cushion 50. The interior volume of the gas storage receptacle 60 must therefore be adequate to house a sufficient volume of inflation gas at a given pressure to achieve the desired inflation characteristics for the inflatable cushion 50. Due to the compressible nature of the inflation gas, the required internal volume for the gas storage receptacle 60 may be reduced as higher gas pressures are maintained. Moreover, higher gas pressures may lead to more rapid expansion of the inflatable cushion 50 when discharge occurs in the manner to be discussed further hereinafter. By way of example only, and not limitation, in order to realize the dual benefits of low storage volume and rapid expulsion of the inflation gas, it is contemplated that the inflation gas will preferably be maintained within the gas storage receptacle 60 at a pressure of about 35 to about 840 Kg/square centimeter or greater and will most preferably be maintained within the gas storage receptacle 60 at a pressure in the range of about 350 to about 420 Kg/square centimeter. The quantity of inflation gas will preferably be adequate to maintain such pressures at temperatures down to about −35 degrees Celsius (238 degrees Kelvin).

The inflation gas itself is preferably of a substantially inert character so as to avoid reaction with the materials forming the gas storage receptacle 60 and/or inflatable cushion 50. Moreover, the inflation gas is preferably characterized by the fact that it does not undergo substantial cooling during adiabatic expansion. The absence of substantial cooling during expansion is believed to reduce the possibility of any freezing across discharge openings during release of the inflation gas. One such inflation gas which may be particularly preferred is helium although it is contemplated that other substantially inert gases such as nitrogen may also be used.

The materials and construction of the gas storage receptacle are such that an adequate volume of high-pressure gas can be stored for extended periods of time without undergoing substantial degradation of the gas pressure. By way of example only, it is contemplated that the elongate body portion 62 of the gas storage receptacle 60 may be formed of seamless tubing of substantially solid walled cylindrical construction having no internally formed outlets across such walled construction. The substantially seamless construction of the body portion 62 is believed to reduce the number of potential leak paths from the gas storage receptacle 60. One such material as may be utilized is 316L stainless steel tubing having an outer diameter of about 12 mm and a wall thickness of about 1 mm so as to yield an inner storage diameter of 10 mm. Another suitable material is believed to be extruded aluminum tubing characterized by an outer diameter of about 14 mm with a wall thickness of about 2 mm so as to yield an inner storage diameter of about 10 mm. The gas storage receptacle will preferably have an outer diameter of not greater than about 30 mm and will more preferably have an outer diameter of less than about 20 mm and will most preferably have an outer diameter of about 15 mm or less.

By way of non-limiting example, based upon a 10 mm internal storage diameter, it is contemplated that approximately 1.75 mols of helium or other inflation gas may be stored within the gas storage receptacle 60 at a pressure of about 420 kilograms per square centimeter when the gas storage receptacle 60 has a length of about 133 cm. Of course, such length may be substantially shortened in the event that the internal storage diameter and/or the storage pressure of the inflation gas is increased.

As previously indicated, the structure of the gas storage receptacle is preferably substantially leak proof so as to avoid any premature pressure degradation. Accordingly, it is contemplated that the elongate body portion 62 of the gas storage receptacle 60 will be substantially free of any valve openings which may leak over time. According to such potentially preferred embodiment, it is contemplated that release of the inflation gas from the gas storage receptacle 60 may be carried out by the controlled localized puncture of the elongate body portion 62 to form an opening through which the pressurized inflation gas can escape.

One activatable gas release mechanism 70 as may be used to carry out the controlled release of inflation gas from the gas storage receptacle 60 is illustrated in FIG. 4. As shown therein, the gas release mechanism 70 includes a sliding collar portion 72 which may be disposed in concentric relation over the elongate body portion 62 of the gas storage receptacle 60. Extending away from the collar portion 72 in substantially normal relation to the gas storage receptacle 60 is a channel member 74 which carries therein a sliding penetrating member 76. As illustrated, the channel member 74 is preferably open in relation to the gas storage receptacle so as to permit impingement of the elongate body portion 62 upon forward movement of the penetrating member 76. Such forward movement and corresponding impingement may be initiated by activation of a squib member 78 having a connector portion 79 for receipt of an activation signal received through leads 80 in communication with one or more activating sensors (not shown).

Referring simultaneously to FIGS. 4 and 4A, upon receipt of an activation signal through lead members 80, the squib member 78 is activated thereby sending a pressure wave against a reaction surface 82 which drives the penetrating member 76 forward within the channel member 74 and into impinging contact with the gas storage receptacle 60 such that the head portion 84 of the penetrating member 76 punctures the body portion 62 of the gas storage receptacle 60 at a predefined location. Due to the high pressure of the inflation gas within the gas storage receptacle 60 such inflation gas tends to be rapidly expelled through the opening formed by the penetrating member 76 for escape out of gas ports 86 disposed at positions around the channel member 74 and into the inflatable cushion 50.

As illustrated in FIGS. 4A and 4B, it is contemplated that the penetrating member 76 may include elongated grooves 90 which extend from locations along the head portion 84 of the penetrating member 76 and down at least a portion of the body 92. Such grooves 90 may facilitate the rapid discharge of inflation gas away from the puncture opening formed by the head portion 84.

It is contemplated that the gas storage receptacle 60 may be arranged either on the exterior or on the interior of the inflatable cushion as may be desired. An external arrangement for the gas storage receptacle 60 in relation to the inflatable cushion 50 is illustrated in FIGS. 2A and 2B. As shown, in such an arrangement the gas ports 86 are disposed within a localized mouth opening at the surface of the inflatable cushion 50 with the elongate body portion 62 arranged along the exterior of the surface of the inflatable cushion 50.

In FIGS. 2C and 2D (wherein elements corresponding to those previously illustrated and described are designated by corresponding reference numerals with a prime) an internal arrangement for the gas storage receptacle 60' in relation to the inflatable cushion 50' is illustrated. In such an arrangement, the gas storage receptacle 60' runs along the upper interior edge of the inflatable cushion 50'. Such an arrangement may be used to provide an enhanced degree of stiffening in a defined geometric profile along the upper edge of the inflatable cushion 50'. Such an arrangement may be useful in some applications in which the gas storage receptacle 60' and the inflatable cushion 50' are to be pre-assembled as a modular unit for subsequent installation along a roof rail 30'.

Regardless of the relative physical orientation of the gas storage receptacle 60, 60' to the inflatable cushion 50, 50', due to the high pressure of the inflation gas, the opening of a flow path by the gas release mechanism 70 (FIG. 4) gives rise to an almost instantaneous discharge of inflation gas out of the gas storage receptacle and into the inflatable cushion thereby causing inflated deployment as illustrated in FIGS. 1, 2B and 2D. As illustrated, the location of inflation gas discharge from the gas storage receptacle 60, 60' and into the inflatable cushion 50, 50' is preferably disposed at an intermediate point along the length of the surface to be covered by the inflatable cushion 50, 50'. That is, inflation of the inflatable cushion 50, 50' may be initiated at its interior. Thus, by way of example only, and not limitation, it is contemplated that inflation of the inflatable cushion 50, 50' may be commenced by the expulsion of an inflating gas from the gas storage receptacle 60, 60' at a location substantially in alignment with the "B" pillar 40 along the vehicle frame thereby promoting the rapid deployment of the inflatable cushion 50, 50' over the "B" pillar at an early stage of an actuating event. Such centralized deployment may be advantageous in some instances. It is also contemplated that gas release mechanisms 70 may be arranged at more than one location along the length of the gas storage receptacle if desired to achieve the controlled initiation of inflation at a number of locations along the length of the inflatable cushion 50, 50' if desired.

As previously indicated, the perforation of the gas storage receptacle 60, 60' is believed to give rise to nearly instantaneous and substantially complete discharge of useful inflation gas into the inflatable cushion 50, 50'. While such instantaneous and substantially complete discharge of inflation gas may be desirable in many instances, it is contemplated that in some instances, a rapid discharge of an initial quantity of inflation gas may be desired to achieve initial inflation and deployment of the inflatable cushion 50, 50' followed by a make-up volume of inflation gas during an extended period to maintain a continuous pressure. Such a multi-staged inflation may be particularly desirable in instances where the inflatable cushion 50, 50' is to remain inflated for an extended period of time.

As illustrated in FIG. 5 wherein previously illustrated and described components are designated by like reference numerals increased by 100, the present invention is readily adapted to provide such multi-staged inflation. According to the illustrated embodiment, it is contemplated that the gas storage receptacle 160 may include a primary storage region 162 which houses a majority of the volume of inflation gas. In addition, the gas storage receptacle 60 may also include at least one secondary storage region 163 which houses some smaller percentage of inflation gas. As illustrated, the primary storage region 162 is separated from the secondary storage region 163 by a flow restrictor 195 such as an orifice plate or nozzle of small internal diameter. A gas release mechanism 170 as previously described is disposed along the primary storage region 162 such that upon activation the inflation gas will be rapidly released from the primary storage region 162 in an almost instantaneous manner. However, due to the presence of the flow restricting member 195, the inflation gas housed within the secondary storage region 163 will tend to be expelled over a longer period of time due to the pressure drop across the flow restricting member 195. This lower rate of expulsion thereby permits the inflation gas housed within the secondary storage region to be discharged into a corresponding inflatable cushion over an extend period of time. Of course, it is contemplated that additional flow restricting elements may also be incorporated at other locations within the gas storage receptacle 160 to achieve three or more stages of inflation at different rates if desired.

It is to be understood that while the present invention has been illustrated and described in relation to certain potentially preferred embodiments, constructions and procedures that such embodiments, constructions and procedures are illustrative only and that the present invention is in no event to be limited thereto. Rather it is contemplated that modifications and variations embodying the fundamental principles of this invention will no doubt occur to those of skill in the art. It is therefore contemplated and intended that the present invention shall extend to all such modifications and variations as may incorporate the broad aspects of the invention within the full spirit and scope of the appended claims and all equivalents thereto.

What is claimed is:

1. An inflatable air bag system comprising: an inflatable cushion element for inflated deployment over a surface to be covered; a gas storage receptacle comprising a substantially gas impermeable sealed enclosure containing a volume of a pressurized inflation medium disposed therein, wherein the pressurized inflation medium consists essentially of a substantially inert pressurized inflation gas; and an activatable gas release mechanism for rapidly discharging the inflation gas from the gas storage receptacle and into the inflatable cushion element, whereby the inflatable cushion element is deployed in covering relation over the surface to be covered, wherein the sealed enclosure comprises an elongate tube element having a body portion of substantially solid wall construction disposed at least partially along an upper edge of the inflatable cushion element and wherein the gas release mechanism comprises a penetrating member adapted to puncture the solid wall body portion of the tube element upon activation of the gas release mechanism such that the pressurized inflation gas is released into the inflatable cushion element.

2. The invention as recited in claim 1, wherein the elongate tube element comprises a substantially solid seamless body portion.

3. The invention as recited in claim 2, wherein the elongate tube element further comprises at least one end cap structure.

4. The invention as recited in claim 1, wherein the penetrating member includes at least one longitudinally disposed surface channel to direct the inflation gas past the penetrating member.

5. The invention as recited in claim 1, wherein the pressurized inflation gas is stored within the sealed enclosure at a pressure of about 35 kilograms per square centimeter or greater.

6. The invention as recited in claim 5, wherein the pressurized inflation gas is stored within the sealed enclosure at a pressure of about 70 kilograms per square centimeter or greater.

7. The invention as recited in claim 5, wherein the pressurized inflation gas is stored within the sealed enclosure at a pressure of about 210 kilograms per square centimeter or greater.

8. The invention as recited in claim 5, wherein the pressurized inflation gas is stored within the sealed enclosure at a pressure of about 350 kilograms per square centimeter or greater.

9. The invention as recited in claim 5, wherein the pressurized inflation gas is stored within the sealed enclosure at a pressure of about 420 kilograms per square centimeter or greater.

10. The invention as recited in claim 1, wherein the pressurized inflation gas is characterized by expansion properties such that it does not undergo substantial cooling during adiabatic expansion.

11. The invention as recited in claim 10, wherein the pressurized inflation gas comprises helium.

12. The invention as recited in claim 11, wherein the pressurized inflation gas is stored within the sealed enclosure at a pressure of about 35 to about 840 kilograms per square centimeter.

13. An inflatable air bag system comprising:
an inflatable cushion element for inflated deployment over an interior surface of a vehicle passenger compartment from a storage position extending at least partially along the length of the vehicle passenger compartment adjacent the roof of the vehicle;
a gas storage receptacle comprising a substantially gas impermeable sealed enclosure containing a volume of pressurized inflation gas disposed therein, the gas storage receptacle being of substantially elongate configuration and extending at least partially along an upper edge of the inflatable cushion element adjacent the roof of the vehicle wherein the sealed enclosure comprises an elongate tube element including a body portion of substantially solid wall construction; and
an activatable gas release mechanism for puncturing the solid wall body portion of the tube element upon activation such that the pressurized inflation gas is released from the gas storage receptacle and into the inflatable cushion element without substantially elevating the temperature of the inflation gas, whereby the inflatable cushion element is deployed in covering relation over the interior surface to be covered.

14. The invention as recited in claim 13, wherein the body portion is characterized by an outer diameter of not greater than about 20 millimeters.

15. The invention as recited in claim 13, wherein both the inflatable cushion element and the gas storage receptacle are mounted to a structural roof rail member extending away from the roof of the vehicle, and wherein upon inflation the inflatable cushion element extends downwardly away from the roof rail member over a side portion of a vehicle passenger compartment.

16. The invention as recited in claim 15, wherein the inflatable cushion element is deployable over a structural pillar element disposed at an intermediate position along the length of the vehicle passenger compartment.

17. The invention as recited in claim 16, wherein the inflatable cushion element is of an elongate curtain-like configuration and wherein the pressurized inflation gas is released from the gas storage receptacle into the inflatable cushion element at an intermediate position along the length of the inflatable cushion element.

18. The invention as recited in claim 13, wherein the inflatable cushion element is of an elongate curtain-like configuration and wherein the pressurized inflation gas is released from the gas storage receptacle into the inflatable cushion element at an intermediate position along the length of the inflatable cushion element.

19. The invention as recited in claim 13, wherein the pressurized inflation gas is characterized by expansion properties such that it does not undergo substantial cooling during adiabatic expansion.

20. The invention as recited in claim 19, wherein the inflation gas is helium.

21. An inflatable air bag comprising:
an inflatable cushion element for inflated deployment over an interior surface of a vehicle passenger compartment from a storage position extending at least partially along the length of the vehicle passenger compartment adjacent the roof of the vehicle;
a gas storage receptacle comprising a substantially gas impermeable sealed enclosure containing a volume of pressurized inflation gas disposed therein, the gas storage receptacle being of substantially elongate configuration and extending at least partially along the length of the vehicle passenger compartment adjacent the roof of the vehicle; and an activatable gas release mechanism for puncturing the scaled enclosure upon activation such that the pressurized inflation gas is released from the gas storage receptacle and into the inflatable cushion element, whereby the inflatable cushion element is deployed in covering relation over the interior surface to be covered, wherein the sealed enclosure comprises a first storage region containing a first volume of pressurized inflation gas and a second storage region containing an additional volume of pressurized inflation gas, the first storage region being in fluid communication with the second storage region across a flow restricting element, and the activatable gas release mechanism being operatively disposed at a position along the first storage region such that upon puncturing the sealed enclosure at the first storage region, the first volume of pressurized inflation gas is initially expelled from the first storage region at a first rate followed by the expulsion of pressurized inflation gas from the second storage region at a second slower rate.

22. The invention as recited in claim 21, wherein the sealed enclosure comprises an elongate tube element.

23. The invention as recited in claim 22, wherein the elongate tube element further comprises at least one end cap structure.

24. The invention as recited in claim 21, wherein the gas release mechanism comprises a penetrating member which punctures the sealed enclosure upon activation of the gas release mechanism, whereby the pressurized inflation gas is released from the gas storage receptacle and into the inflatable cushion element.

25. The invention as recited in claim 24, wherein the penetrating member includes at least one longitudinally disposed surface channel to direct the inflation gas past the penetrating member.

26. The invention as recited in claim 21, wherein the pressurized inflation gas is stored within the sealed enclosure at a pressure of about 35 kilograms per square centimeter or greater.

27. The invention as recited in claim 26, the pressurized inflation gas is stored within the sealed enclosure at a pressure of about 70 kilograms per square centimeter or greater.

28. The invention as recited in claim 26, wherein the pressurized inflation gas is stored within the scaled enclosure at a pressure of about 210 kilograms per square centimeter or greater.

29. The invention as recited in claim 26, wherein the pressurized inflation gas is stored within the sealed enclosure at a pressure of about 350 kilograms per square centimeter or greater.

30. The invention as recited in claim 26, wherein the pressurized inflation gas is stored within the sealed enclosure at a pressure of about 420 kilograms per square centimeter or greater.

31. The invention as recited in claim 21, wherein the pressurized inflation gas is substantially inert.

32. The invention as recited in claim 31, wherein the pressurized inflation gas is characterized by expansion properties such that it does not undergo substantial cooling during adiabatic expansion.

33. The invention as recited in claim 32, wherein the pressurized inflation gas comprises helium.

34. The invention as recited in claim 33, wherein the pressurized inflation gas is stored within the sealed enclosure at a pressure of about 35 to about 840 kilograms per square centimeter.

35. An inflatable air bag system comprising:

an inflatable cushion clement of substantially curtain-like construction for inflated deployment over an interior side surface of a vehicle passenger compartment from a storage position extending at least partially along the length of the vehicle passenger compartment adjacent the roof of the vehicle;

a gas storage receptacle comprising a substantially gas impermeable sealed enclosure of substantially solid wall elongate tubular construction containing a volume of pressurized helium gas disposed therein, the gas storage receptacle extending at least partially along an upper edge of the inflatable cushion element adjacent the roof of the vehicle; and an activatable gas release mechanism far puncturing the solid wall of the sealed enclosure upon activation such that the pressurized inflation gas is released from the gas storage receptacle and into the inflatable cushion element at an interior location disposed along the length of the inflatable cushion element, whereby the inflatable cushion element is deployed in covering relation over the interior surface to be covered.

* * * * *